US010606677B2

(12) United States Patent
Lo (10) Patent No.: US 10,606,677 B2
(45) Date of Patent: Mar. 31, 2020

(54) METHOD OF RETRIEVING DEBUGGING DATA IN UEFI AND COMPUTER SYSTEM THEREOF

(71) Applicant: American Megatrends International, LLC, Norcross, GA (US)

(72) Inventor: Chin-Sung Lo, Taipei (TW)

(73) Assignee: AMERICAN MEGATRENDS INTERNATIONAL, LLC, Norcross, GA (US)

(*) Notice: Subject to any disclaimer, the term of this patent is extended or adjusted under 35 U.S.C. 154(b) by 184 days.

(21) Appl. No.: 15/688,401

(22) Filed: Aug. 28, 2017

(65) Prior Publication Data

US 2019/0065300 A1 Feb. 28, 2019

(51) Int. Cl.
| G06F 11/07 | (2006.01) |
| G06F 21/57 | (2013.01) |
| H04W 4/80 | (2018.01) |
| G06F 11/36 | (2006.01) |

(52) U.S. Cl.
CPC .......... *G06F 11/0766* (2013.01); *G06F 11/36* (2013.01); *G06F 21/572* (2013.01); *H04W 4/80* (2018.02); *G06F 21/575* (2013.01); *G06F 2221/033* (2013.01)

(58) Field of Classification Search
CPC combination set(s) only.
See application file for complete search history.

(56) References Cited

U.S. PATENT DOCUMENTS

| 10,069,962 | B1* | 9/2018 | Yau ........................ B60R 25/01 |
| 10,219,135 | B1* | 2/2019 | Yau ....................... H04B 5/0031 |
| 2004/0267708 | A1* | 12/2004 | Rothman ............ G06F 11/2284 |
| 2016/0077905 | A1* | 3/2016 | Menon ................ G06F 11/3648 714/37 |

* cited by examiner

*Primary Examiner* — Amine Riad
(74) *Attorney, Agent, or Firm* — Birch, Stewart, Kolasch & Birch, LLP (57) ABSTRACT

A computer system includes a memory and computer-readable instructions stored at the memory and executable by a microprocessor to: receiving a debug retrieval request to retrieve a debug status data during execution of a UEFI firmware; initiating a debug aggregation function in response to the debug retrieval request; and aggregating the debug status data into a NFC data token.

12 Claims, 9 Drawing Sheets

| Page | Adr | Byte number within a page | | | | Descripion |
|---|---|---|---|---|---|---|
| Dec | Hex | 0 | 1 | 2 | 3 | |
| 0 | 0h | serial number | | | | Manufacturer data and static lock bytes |
| 1 | 1h | serial number | | | | |
| 2 | 2h | serial number | internal | lock bytes | lock bytes | |
| 3 | 3h | Capability Container (CC) | | | | Capability Container |
| 4 | 4h | user memory | | | | User memory pages |
| 5 | 5h | | | | | |
| ... | ... | | | | | |
| 38 | 26h | | | | | |
| 39 | 27h | | | | | |
| 40 | 28h | dynamic lock byies | | | RFUI | Dynamic lock bytes |
| 41 | 29h | CFG 0 | | | | Configuration pages |
| 42 | 2Ah | CFG 1 | | | | |
| 43 | 2Bh | PWD | | | | |
| 44 | 2Ch | PACK | | PFUI | | |

METHOD OF RETRIEVING DEBUGGING DATA IN UEFI AND COMPUTER SYSTEM THEREOF

BACKGROUND

1. Technical Field

The present disclosure generally relates to a method of retrieving debugging data generated during execution of a UEFI firmware and computer system thereof; particularly, the present disclosure relates to a method and computer system for retrieving debugging data generated during execution of a UEFI firmware into a NFC token.

2. Description of the Related Art

Traditionally, computing systems may boot to an operating system. The boot up of the operating system is typically handled by a low level instruction code that is used as an intermediary between the hardware components of the computing system and the operating software and other high level software executing on the computing system. This low level instruction code is often known as the Basic Input/Output System ("BIOS") firmware and provides a set of software routines that allow high level software to interact with the hardware components of the computing system. The firmware performs routines for conducting Power-On Self Test ("POST") each time the computing system is powered on in order to test and initiate all hardware components in the computing system before handing off control to the operating system. These hardware components may include the system main memory, disk drives, and keyboards.

However, as technology has progressed with many devices such as peripheral devices advancing towards being wireless or cordless, boot up firmwares based on the traditional BIOS standard, which was originally designed for personal computers of International Business Machine Corporation (IBM), have become a point of restriction or limitation as to what the boot up firmware may control with respect to hardware and subsequently what hardware the Operating System may control. As new hardware and software technologies were being developed, this source of restriction became a major obstacle in the hardware-software interaction. As a result, a new standard of BIOS firmware has been proposed and widely adopted by many major industry leaders. This new standard is called the Unified Extensible Firmware Interface (UEFI).

With the adoption of UEFI standards, BIOS companies were able to produce UEFI firmware for computing systems, while companies producing Operating Systems were able to take advantage of the services these UEFI firmware provided by producing UEFI compliant Operating Systems.

However, many times, an engineer in research and development, a technician in services and repairs, or a quality assurance engineer may need to rapidly assess or diagnose any errors that may occur during the execution of the UEFI firmware or errors that may occur with the UEFI firmware itself. Traditionally, the retrieval of debugging information from the UEFI firmware is a slow manual process of either reading the output on a console window line for line. Typically, an engineer needs to be present during execution of the firmware to catch the error. When the manufacturing or QC (Quality Control) operation is scaled up, the number of man hours needed to be dedicated to just retrieving these debugging information multiplies exponentially. Therefore, there is a need to aggregate debugging information from numerous computer systems quickly and without the need of engineers to standby waiting for the computer systems to complete their runs.

SUMMARY

It is an objective of the present disclosure to provide a computer system and a method thereof for retrieving debugging data from an UEFI firmware executed on the computer system.

It is another objective of the present disclosure to provide a computing system and a method thereof for increasing the ease and speed of retrieving debugging data from an UEFI firmware executed on the computer system.

According to one aspect of the invention, a computer system includes a memory and computer-readable instructions stored at the memory and executable by a microprocessor to: receiving a debug retrieval request to retrieve a debug status data during execution of a UEFI firmware; initiating a debug aggregation function in response to the debug retrieval request; and aggregating the debug status data into a NFC data token.

According to another aspect of the invention, a computer implemented method includes receiving a debug retrieval request to retrieve a debug status data during execution of an UEFI firmware of a computer system; initiating a debug aggregation function in response to the debug retrieval request; and aggregating the debug status data into a NFC data token.

DETAILED DESCRIPTION OF THE PREFERRED EMBODIMENT

Embodiments of the present invention provide methods and systems for executing a UEFI firmware capable of supporting pre-boot initialization of a bootloader program in a computer system, wherein debugging data generated during the execution of the firmware can be collected and aggregated into a NFC (Near Field Communication) tag or token.

In the following detailed description, references are made to the accompanying drawings that form a part hereof, and in which are shown by way of illustration specific embodiments or examples. These embodiments are only illustrative of the scope of the present invention, and should not be construed as a restriction on the present invention. Referring now the drawings, in which like numerals represent like elements through the several figures, aspects of the present invention and the exemplary operating environment will be described.

The present disclosure provides a computer system and method thereof for retrieving and aggregating debug status data generated during execution of an UEFI firmware into a NFC token. Preferably, the computer system includes (but not limited to) laptop computers, personal computers, computer servers, handheld computer devices such as mobile smart phones, tablet computers, and wearable computing devices.

Figure 1:
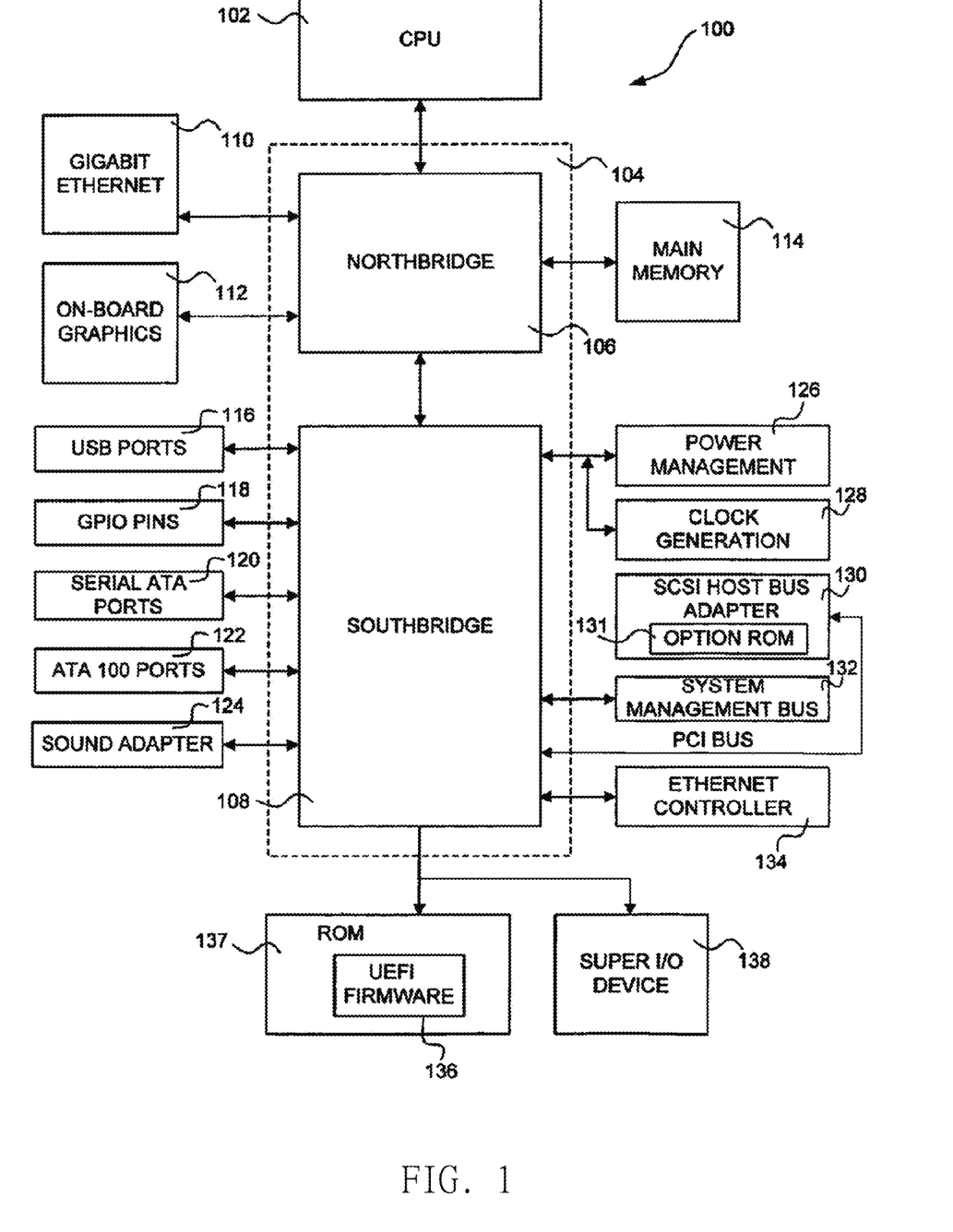
FIG. 1 is a view of an embodiment of a computer system of the present invention.

FIG. 1 and the following discussion are intended to provide a brief, general description of a suitable computing environment in which the invention may be implemented. However, those skilled in the art will recognize that the invention may also be implemented in other suitable computing environments.

Referring to FIG. 1, an illustrative computer architecture for practicing the embodiments discussed herein will be described. It should be appreciated that although the embodiments described herein are discussed in the context of a conventional desktop or server computer, the embodiments may be utilized with eventually any type of computing device. FIG. 1 shows an illustrative computer architecture for a computer system 100 that is operative to initiate an operating system boot from firmware. The blocks of FIG. 1 are intended to represent functional components of the computer architecture and are not intended to necessarily represent individual physical components. Functional components described may be combined, separated, or removed without departing from the overall sense and purpose of the computer architecture.

In order to provide the functionality described herein, the computer system 100 includes a baseboard, or "motherboard", which is a printed circuit board to which a multitude of components or devices may be connected by way of a system bus or other communication path. In one illustrative embodiment, a central processing unit (CPU) 102 operates in conjunction with a chipset 104. The CPU 102 may be a standard central processor that performs arithmetic and logical operations necessary for the operation of the computer. The CPU 102, in this and other embodiments, may include one or more of a microprocessor, a microcontroller, a field programmable gate array (FPGA), a complex programmable logic device (CPLD), an application specific integrated circuit (ASIC), and/or any other electronic computing device.

The chipset 104 includes a northbridge 106 and a southbridge 108. The northbridge 106 provides an interface between the CPU 102 and the remainder of the computer system 100. The northbridge 106 also provides an interface to one or more random access memories (RAM) used as a main memory 114 in the computer system 100 and, possibly, to an on-board graphics adapter 112. The northbridge 106 may also enable networking functionality through a gigabit Ethernet adapter 110. The gigabit Ethernet adapter 110 is capable of connecting the computer system 100 to one or more other computers via a network. Connections that may be made by the adapter 110 may include local area network (LAN) or wide area network (WAN) connections, for example. LAN and WAN networking environments are commonplace in offices, enterprise-wide computer networks, intranets, and on the Internet. The northbridge 106 is connected to the southbridge 108.

The southbridge 108 is responsible for controlling many of the input/output functions of the computer system 100. In particular, the southbridge 108 may provide one or more universal serial bus (USB) ports 116, a sound adapter 124, an Ethernet controller 134, and one or more general purpose input/output (GPIO) pins 118. The southbridge 108 may also provide a bus for interfacing peripheral card devices such as a BIOS boot specification (BBS) compliant SCSI host bus adapter 130. In one embodiment, the bus comprises a peripheral component interconnect (PCI) bus. The southbridge 108 may also provide a system management bus 132 for use in managing the various components of computer system 100. Power management circuitry 126 and clock generation circuitry 128 may also be utilized during operation of the southbridge 108.

The southbridge 108 is also operative to provide one or more interfaces for connecting mass storage devices to the computer system 100. For instance, according to an embodiment, the southbridge 108 includes a serial advanced technology attachment (SATA) adapter for providing one or more serial ATA ports 120 and an ATA100 adapter for providing one or more ATA100 ports 122. The serial ATA ports 120 and the ATA100 ports 122 may be, in turn, connected to one or more mass storage devices storing an operating system, application programs, and other data. As known to those skilled in the art, an operating system comprises a set of programs that control operations of a computer and allocation of resources. An application program is software that runs on top of the operating system software, or other runtime environment, and uses computer resources to perform application specific tasks desired by a user of the computer system 100.

The mass storage devices connected to the southbridge 108 and the SCSI host bus adapter 130, and their associated computer-readable media, provide non-volatile storage for the computer system 100. Although the description of computer-readable media contained herein refers to a mass storage device, such as a hard disk or CD-ROM drive, it should be appreciated by those skilled in the art that computer-readable media can be any available media that can be accessed by the computer system 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count (LPC) interface may also be provided by the southbridge 108 for connecting a Super I/O device 138. The Super I/O device 138 is responsible for providing a number of input/output ports, including a keyboard port, a mouse port, a serial interface, a parallel port, and other types of input/output ports. The LPC interface or another interface may be utilized to connect a computer storage medium such as a ROM 137. In an alternative embodiment, the ROM 137 can be replaced by a non-volatile random access memory (NVRAM) such as a flash memory. The computer storage medium may be used for storing the firmware 136 that includes modules containing instructions and data that help to startup the computer system 100 and to transfer information between elements within the computer system 100. However, in other different embodiments, the firmware 136 may be stored in any other areas in the computer system 100.

The firmware 136 may include program code that is compatible with the UEFI specification. It should be appreciated that in addition to the firmware 136 including an UEFI-compatible firmware, other types and combinations of firmware may be included. For instance, the firmware 136 may include additionally or alternatively a BIOS firmware and/or other type of firmware known to those in the art. Additional details regarding the operation of the UEFI firmware 136 are provided below with respect to the subsequent diagrams. It should be appreciated that the computer system 100 may not include all of the components shown in FIG. 1, may include other components that are not explicitly shown in FIG. 1, or may utilize an architecture completely different than that shown in FIG. 1.

Figure 2:
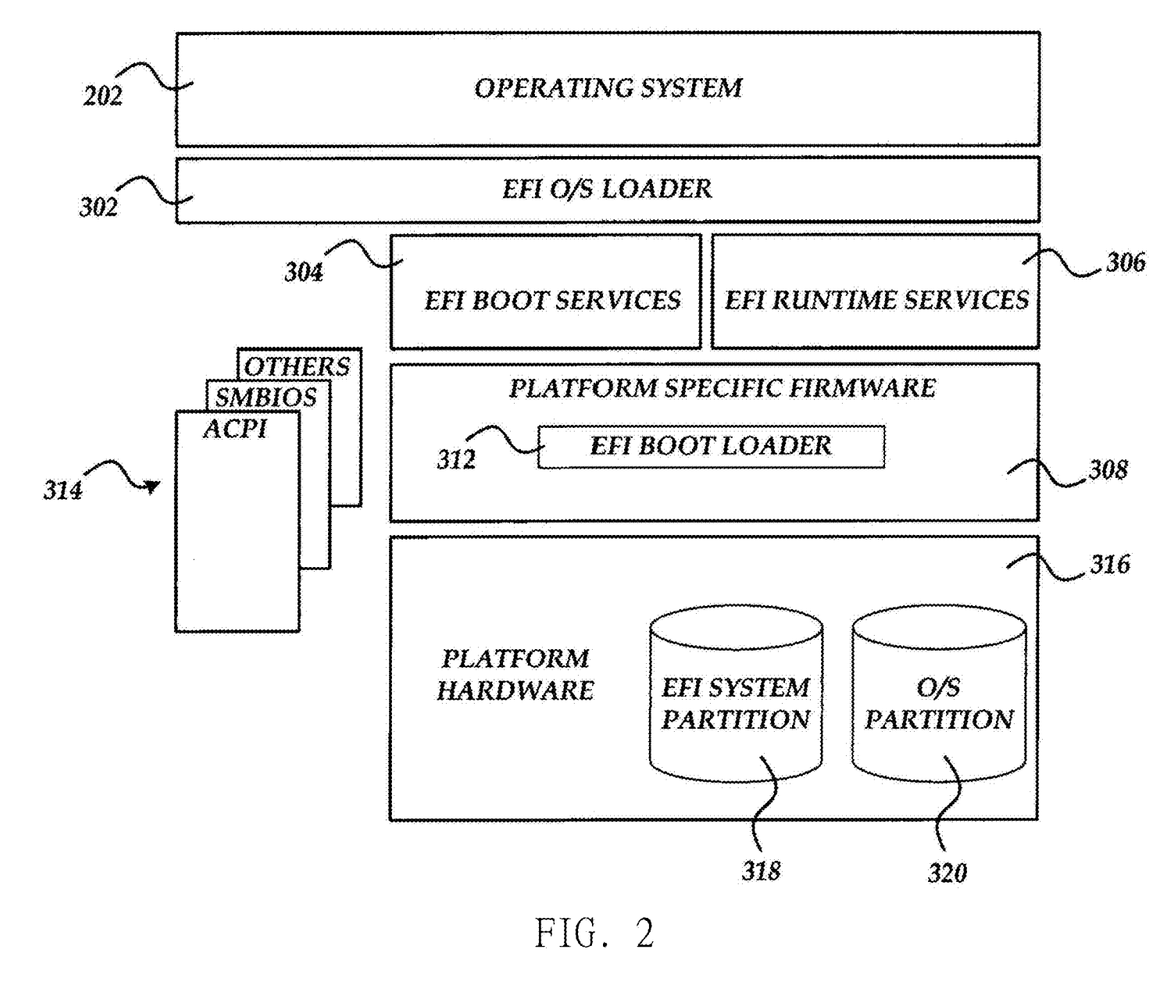
FIG. 2 is a view of an UEFI specification-compliant system.

Referring to FIG. 2, additional details regarding an UEFI specification-compliant system that may be utilized to provide an operating environment for the various implementations presented herein will be described. As shown in FIG. 2, the system includes a platform hardware 316 and an operating system (OS) 202. A platform firmware 308 may retrieve OS program code from the EFI system partition 318 using an OS loader 302, sometimes referred to as a boot loader or an OS boot loader. Likewise, the OS loader 302 may retrieve OS program code from other locations, including from attached peripherals or from the firmware 136 itself. The EFI system partition 318 may be an architecturally shareable system partition. As such, the EFI system partition 318 defines a partition and file system that are designed to allow safe sharing of mass storage between multiple vendors. An OS partition 320 may also be utilized.

EFI boot services 304 provide interfaces for devices and system functionality that can be used during boot time. EFI runtime services 306 are available to the OS loader 302 during the boot phase and to an operating system 202 when it is running. For example, runtime services may be presented to ensure appropriate abstraction of base platform hardware resources that may be needed by the operating system 202 during its normal operation. EFI allows extension of platform firmware by loading EFI drivers and EFI application images which, when loaded, have access to all EFI-defined runtime and boot services. Once the EFI firmware is initialized, it passes control to the boot loader 312.

Figure 3:
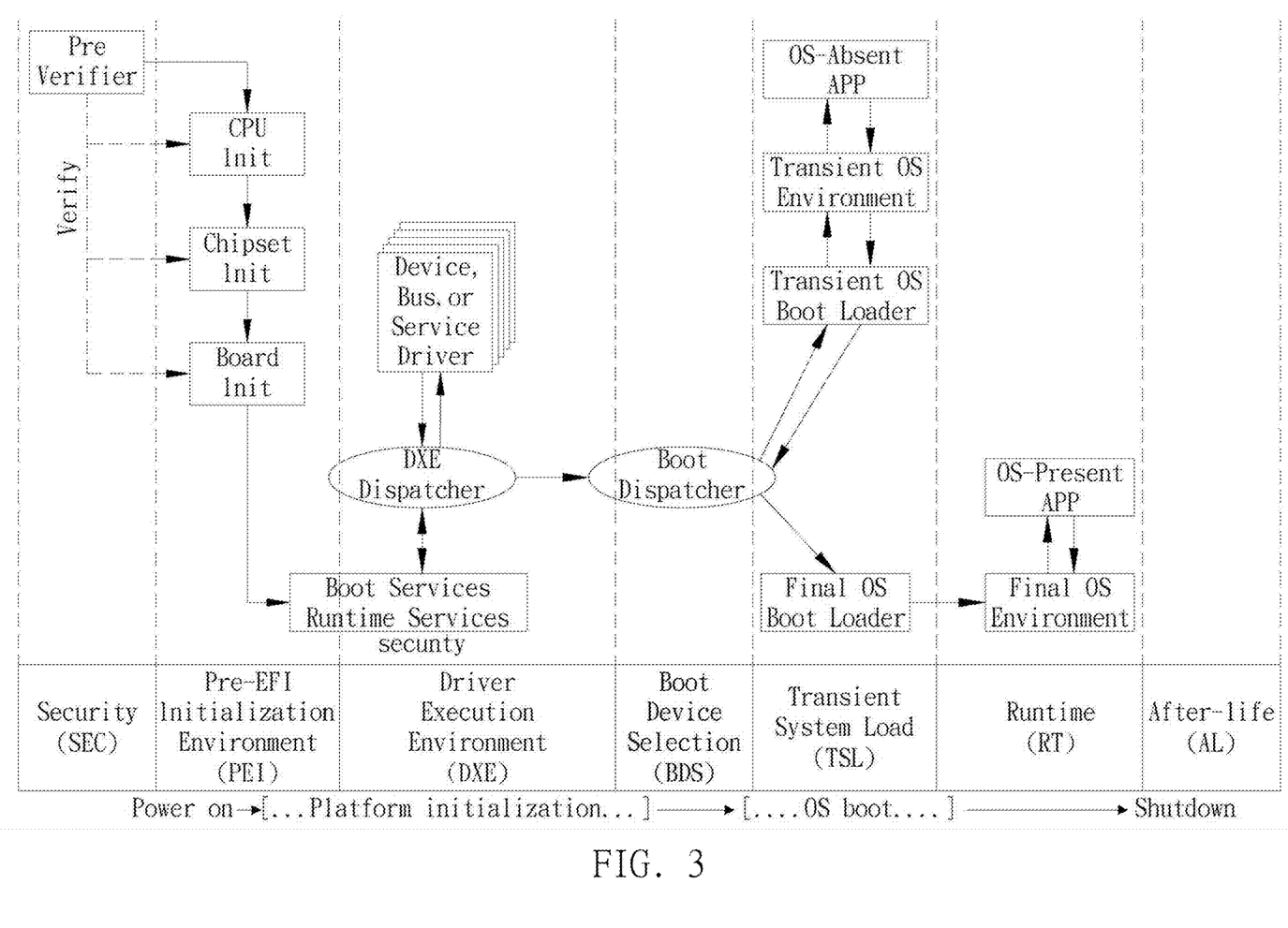
FIG. 3 is a view of the different stages during execution of an UEFI firmware.

Referring to FIG. 3, details are shown to illustrate the different phases or stages the UEFI firmware progresses through towards boot up of an Operating System. As shown in FIG. 3, when the computer system 100 is powered on, the UEFI firmware of the present invention is executed by the processor of the computer system 100. The UEFI firmware will first enter a Security (SEC) phase, wherein no memory has yet been initialized in the computer system 100. In the present phase, since no memory has yet been initialized, the processor's cache is used as a Random Access Memory (RAM) to pre-verify the central processing unit (CPU), the chipset, and the main board. Next, the UEFI firmware enters the Pre-EFI Initialization (PEI) phase, wherein the CPU, the chipset, the main board, and the memory of the computer system 100 are initialized. In the Driver Execution (DXE) phase, boot services, runtime services, and driver execution dispatcher services may be executed to initialize any other hardware in the computer system 100. Following the DXE phase, the UEFI firmware enters into the Boot Device Selection (BDS) phase. In the BDS phase, attempts are made to initialize console devices as well as various drivers corresponding to the boot loader for the Operating System. In the Transient System Load (TSL) phase, control is handed off to the Operating System to continue the start up of the computer system 100 before reaching the Runtime (RT) phase of normal operation of the computer system 100.

Figure 4A:
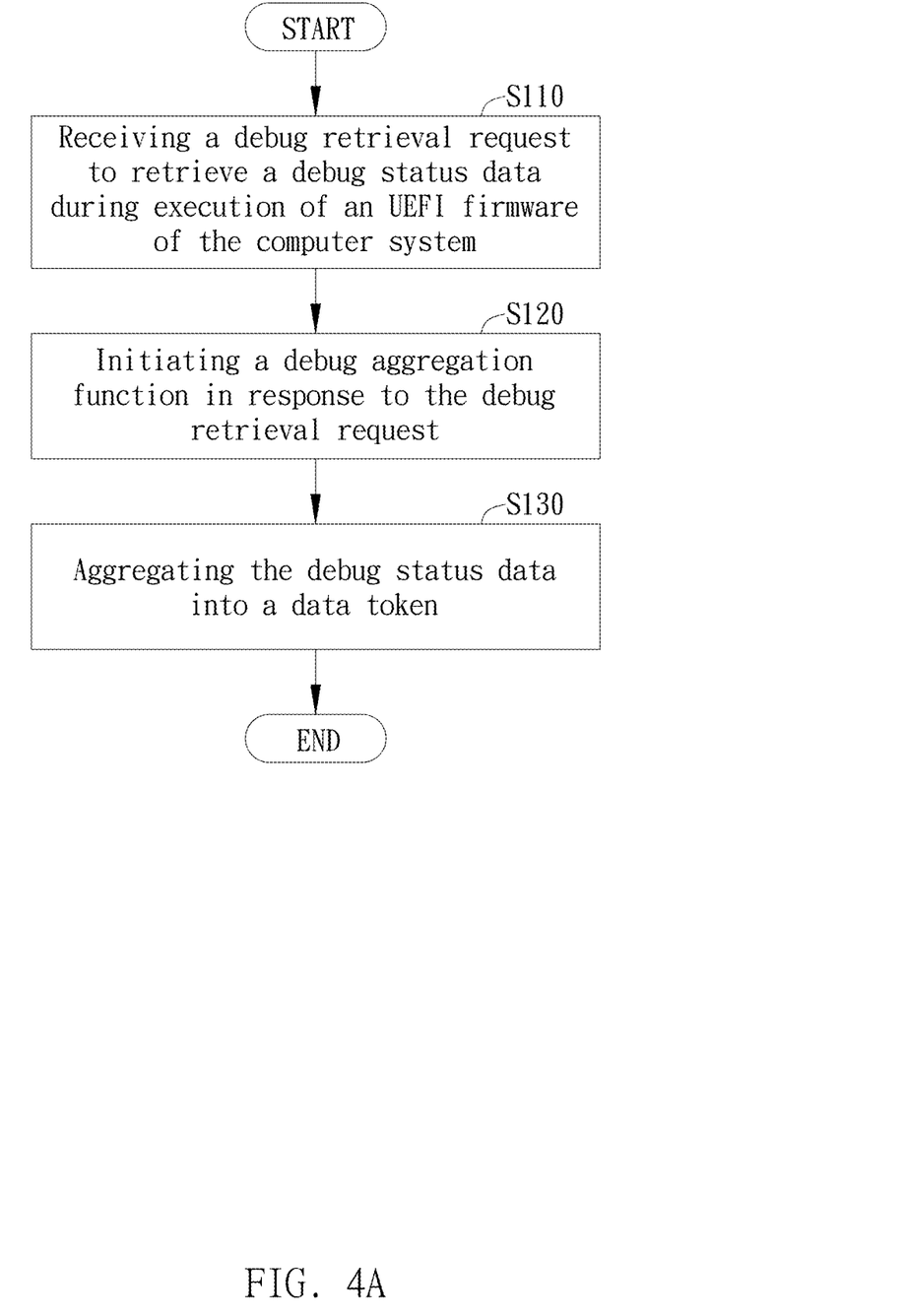
FIG. 4A is an embodiment of a flowchart of the method of the present invention.

FIG. 4A illustrates an aspect of the embodiment of the present invention. As shown in FIG. 4A, a method for retrieving debugging information generated during any of the phases or stages prior to control being handed off to the Operating System, wherein the method includes steps S110 to S130.

Step S110 includes receiving a debug retrieval request to retrieve a debug status data during execution of the UEFI firmware of the computer system 100. When the computer system 100 is first powered on, the computer system 100 will proceed to initiate or execute the UEFI firmware in order to start the process of booting up the Operating System. As mentioned, the UEFI firmware will progress through the SEC, PEI, DXE, and BDS phases or stages before the Operating System takes over control of the computer system 100. In the present embodiment, while the UEFI firmware is being executed, a debug retrieval request may be received. The purpose of this request or instruction is to notify the computer system 100 that any debugging or diagnostic information that is generated during the execution of the UEFI firmware should be collected or retrieved as the debug status data so that they may be presented to the user.

In one embodiment, users may transmit or relay the debug retrieval request to the computer system 100 by pressing a key or combination of keys on a keyboard that is coupled to the computer system 100. This may be performed at the start of the SEC phase or may be performed at any time during any of the SEC, PEI, DXE, and BDS phases or stages. In an embodiment, if the UEFI firmware is capable of initializing the communication or networking module of the computer system 100, the debug retrieval request may be received by the computer system 100 from a remote computer via said networking module. In this manner, multiple computer systems 100 may receive the debug retrieval request from the remote computer. The benefit or advantage of this is that the user can relay the debug retrieval request to a plurality of target computers at the same time without having to be physically present at each of the target computers.

As shown in FIG. 4A, step 120 includes initiating a debug aggregation function in response to the debug retrieval request. In the present embodiment, if the computer system 100 receives the debug retrieval request during one of the above phases or stages, the computer system 100 will first initiate the debug aggregation function in order to start the process of collecting diagnostic or debug status data.

If the computer system 100 receives the debug retrieval request at the beginning of the SEC phase, all debugging information generated thereafter will be collected by the debug aggregation function.

If the computer system 100, however, receives the debug retrieval request during one of the subsequent phases after the SEC phase, in the present embodiment, the debug aggregation function will only start collecting or gathering debug status data that are generated after the debug retrieval request is received. However, in another embodiment, the computer system 100 may automatically save diagnostic or debugging information during the execution of the UEFI firmware. In this case, even if the debug retrieval request is received sometime in one of the later phases or stages, the debug aggregation function can still access and retrieve the saved debugging information such that all debug status data generated through all the stages before the Operating System is booted up may be aggregated and presented to the user.

As illustrated in FIG. 4A, step S130 includes aggregating the debug status data into a data token. In the present embodiment, the debug status data may consist of many different types of debugging information that are generated at different times and in different phases or stages of the UEFI firmware. In other words, the debug status data may include a tremendous amount of information that may or may not be easily viewable or accessible to the user in the present form or format. Therefore, in the present embodiment. Step 130 is directed towards transforming or packaging the collected or aggregated debug status data into a data token or data tag to present to the user.

Figure 4B:
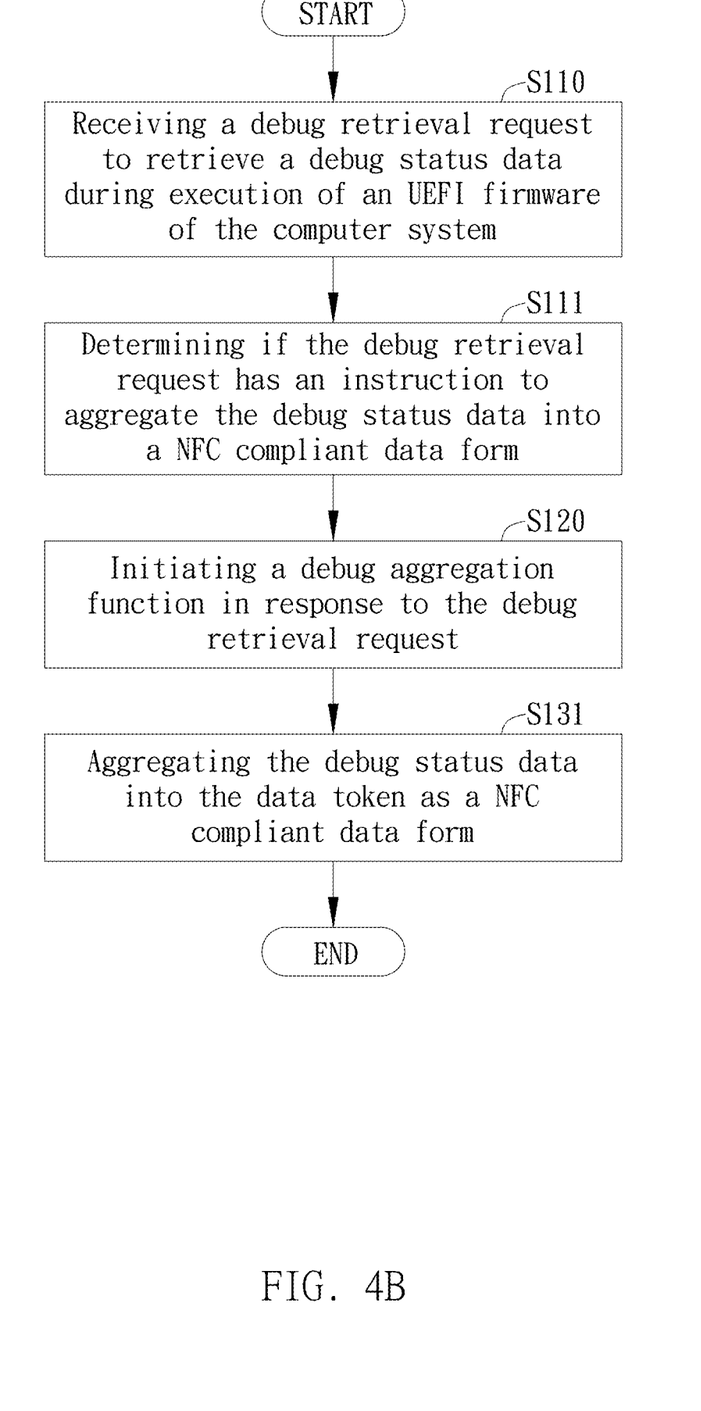
FIG. 4B is another embodiment of FIG. 4A.

FIG. 4B is another embodiment of the method illustrated in FIG. 4A. As shown in FIG. 4B, the method may further include a step 111 between steps S110 and S120. Step S111 includes determining if the debug retrieval request has an instruction to aggregate the debug status data into a NFC compliant data form. In the present embodiment, the user is allowed to specify at the time of relaying the debug retrieval request the format that the user would like to receive the data token or data tag. Following Step S120, after Step S111 has determined that the NFC option is requested, the computer system 100 will then subsequently transform the debug status data into a data token or tag that has a NFC compliant data form.

For instance, if the user would like to utilize NFC (Near Field Communication) technology, the user can include this option into the debug retrieval request. When the computer system 100 receives the debug retrieval request, this request for NFC format will be detected in the debug retrieval request by the computer system 100 and prompt the computer system 100 to subsequently format the data token or tag into a NFC compliant data format. Examples of NFC compliant data format may include conventions following the NFC Data Exchange Format (NDEF). This is useful in the case of doing debugging work on mobile devices since most modern mobile device has NFC as a built-in option. In this manner, any debugging information generated by the mobile devices, for instance, may be easily aggregated and retrieved through the NFC interface of the mobile device.

Figure 5:
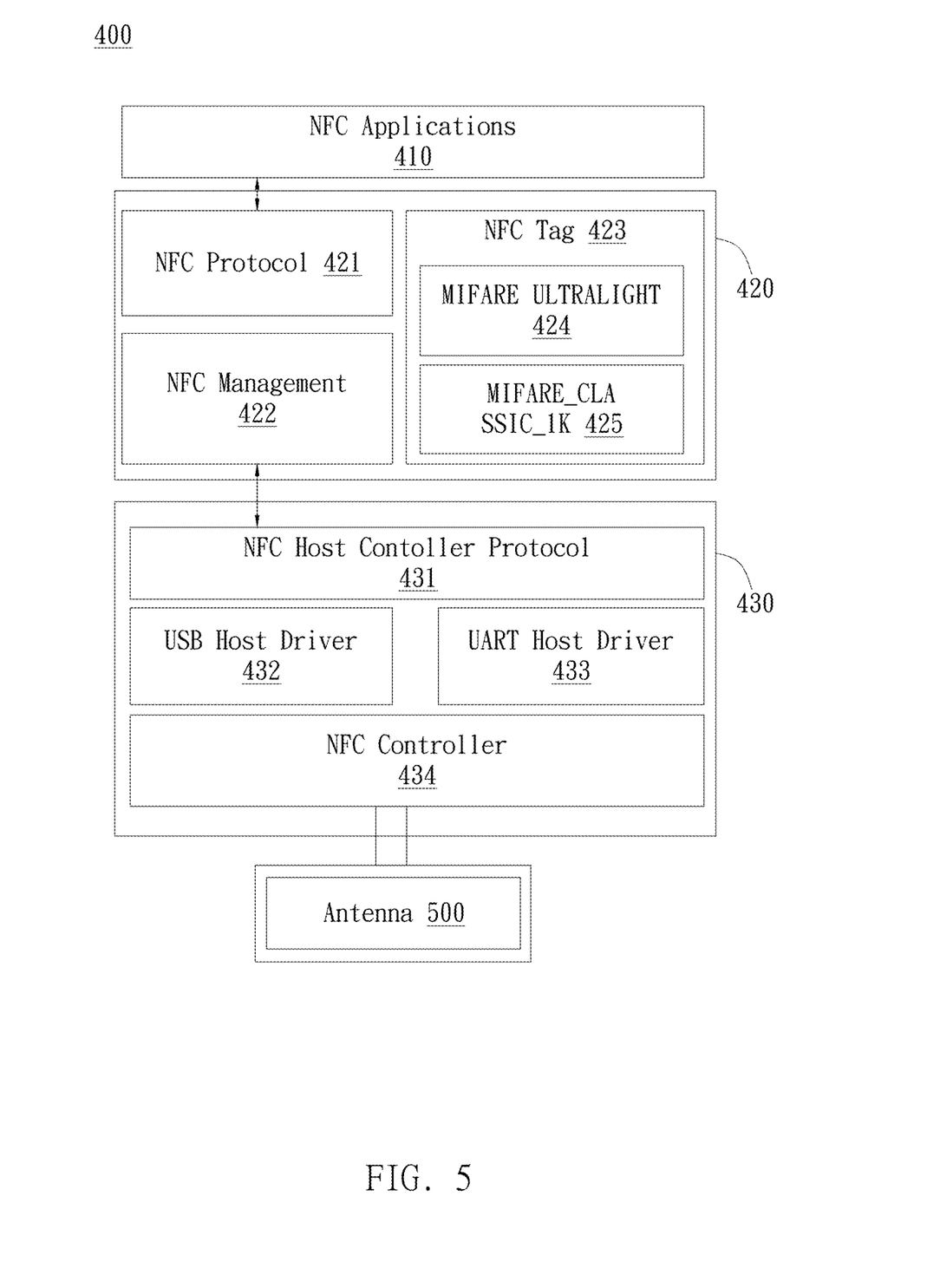
FIG. 5 is an embodiment of a block diagram of the NFC implementation of the present invention.

FIG. 5 illustrates an embodiment of a block diagram of a NFC implementation in the computer system 100. As shown in FIG. 5, the NFC block 400 includes a NFC Application layer 410, a NFC Management layer 420, and a NFC Host Controller Driver layer 430. An antenna 500 may also be coupled to NFC Host Controller Driver layer 430 to allow the computer system 100 to communicate with other devices.

As illustrated in FIG. 5, in the present embodiment, the NFC Application layer 410 is an interface for the computer system 100 to communicate or transfer data through the NFC Management layer 420 and NFC Host Controller Driver layer 430. As mentioned above, when the computer system 100 determines that the debug retrieval request includes the NFC option, the computer system 100 will start to collect debug status data in a NFC compliant data format, such as the NDEF message format as defined by the NFC forum.

The aggregated debug status data is communicated to the NFC Management layer 420 via the NFC Application layer 410 by these NDEF messages. The NFC Management layer 420 manages the NFC and tags/token operation, such as producing the NFC protocol for the NFC Application layer 410 to accomplish the token or tag operation of the debug status data. In the present embodiment, there are typically four distinct tag types (Type 1 to Type 4 tags) that may be implemented depending on the NFC Protocol that is adopted in the NFC Management layer 420. These four distinct tag types provide different communication speeds and capabilities that include different properties on memory, security, data retention and write endurance. Depending on the needs of the computer system 100 and/or the requests the NFC Management layer 420 receives, the tag type of the NFC Tag 423 may change.

For instance, in the present embodiment illustrated in FIG. 5, a vendor specific MiFARE Ultralight 424 (manufactured by NXP Semiconductors N.V.) and a MiFARE_Classic_1k 425 may be present. The MiFARE Ultralight 424 uses the MiFARE Ultralight protocol and is typically associated with Type 2 tags (tokens). MiFARE_Classic_1k 425 (or MiFARE Std 1k/4k) utilizes the MiFARE protocol and is typically associated with vendor specific tag type (NFC Forum Formatted Tag). It should be noted that no restriction on the type of tags or protocols is implied.

As illustrated in. FIG. 5, the NFC Host Controller Driver layer 430 includes a NFC Host Controller Protocol 431. The NFC Host Controller Protocol 431 allows the upper layers to send requests to other NFC reader chips to read/write their respective NFC tags. For instance, if the user wanted to retrieve and save the debug status information, a NFC reader may be held in close proximity to the physical communication component utilized by the NFC Host Controller Driver layer 430. In the case of the example illustrated in the embodiment of FIG. 5, the NFC controller 434 is coupled to the antenna 500, wherein users may place the NFC reader in close proximity to the antenna 500 in order to receive the debug status data (in NFC tag format) into the NFC reader.

Figure 6:
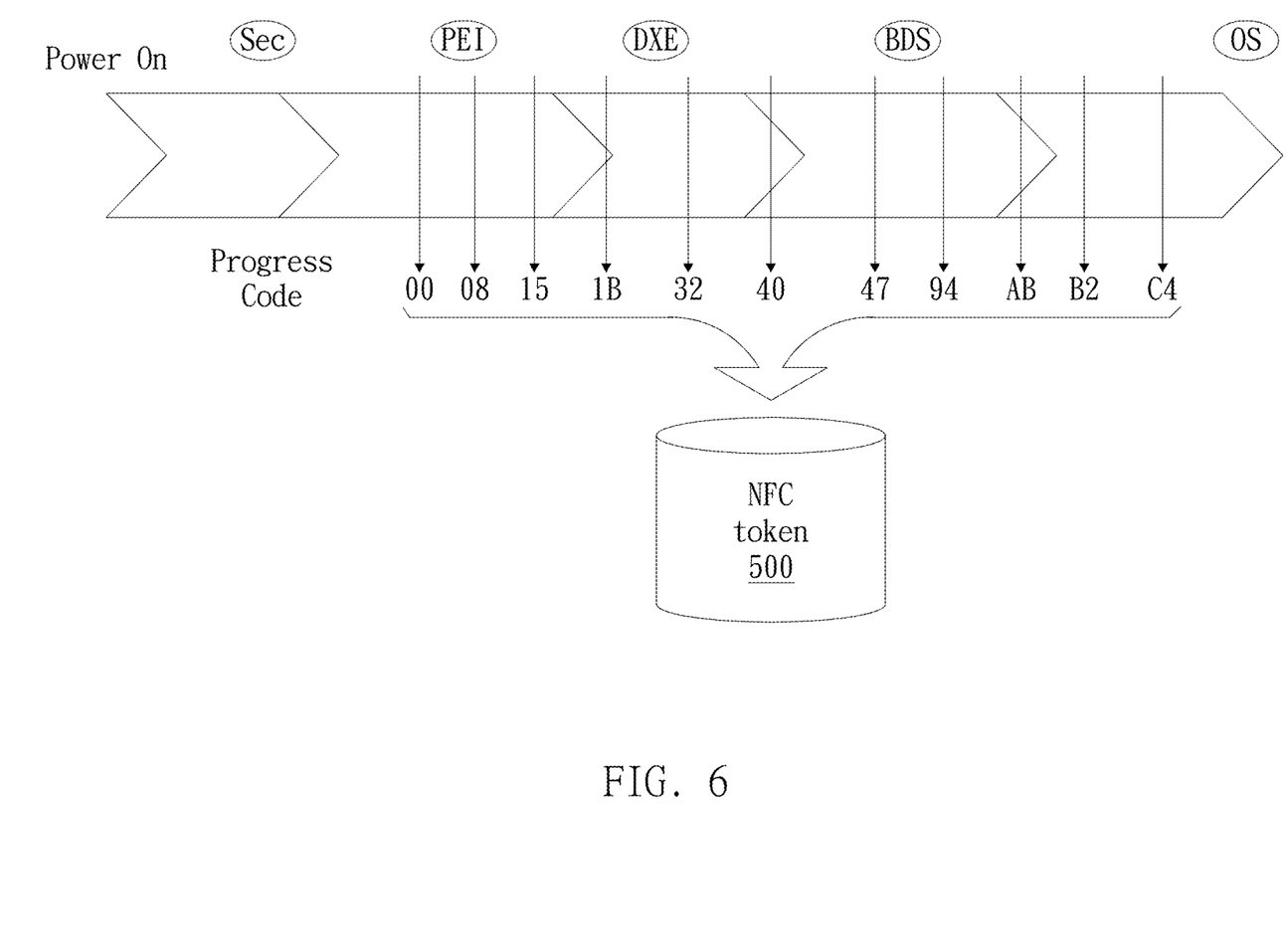
FIG. 6 is an exemplary embodiment of the types of debug data that may be aggregated into the NFC token of the present invention.
Figure 7:
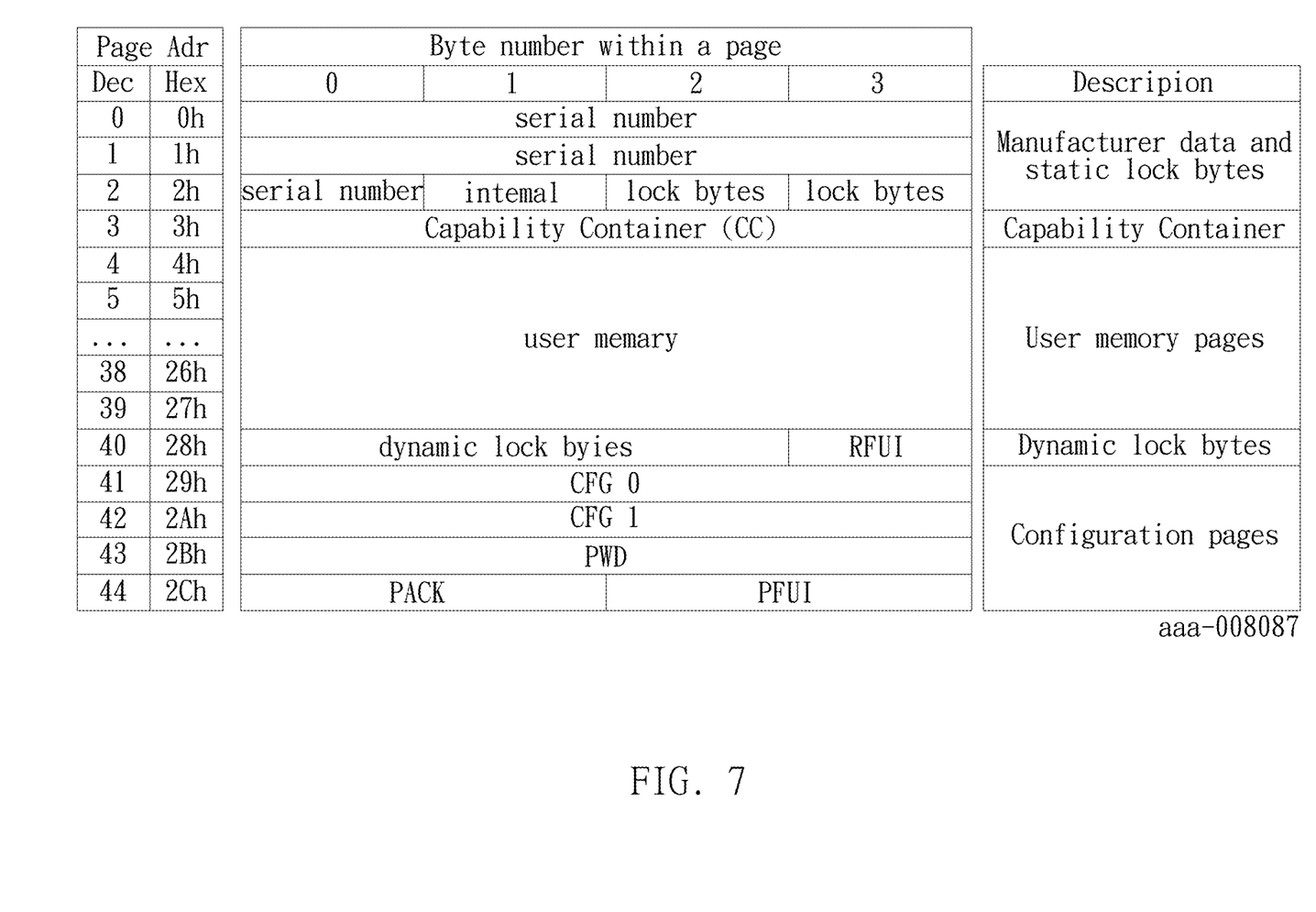
FIG. 7 is an embodiment of a NFC compliant data form of the present invention.
Figure 8:
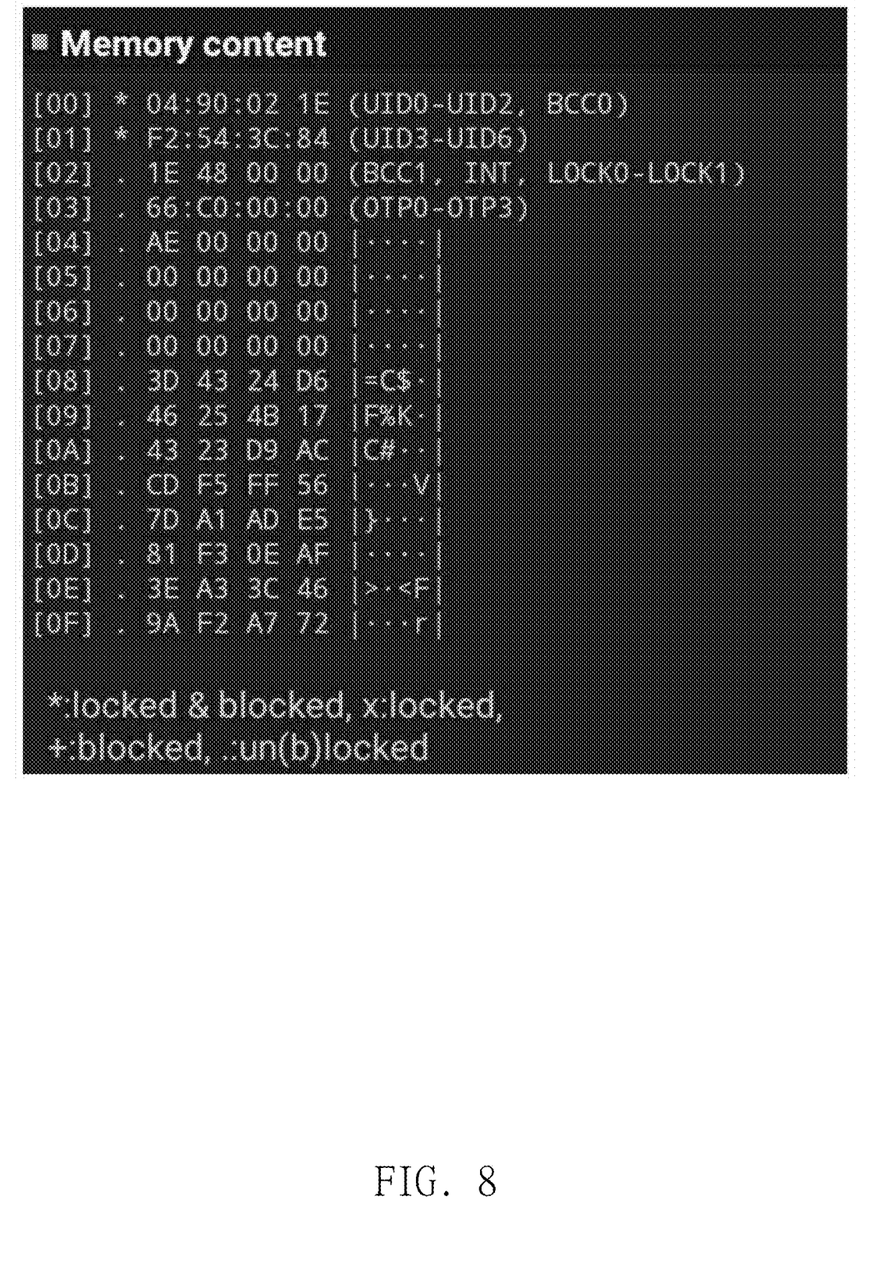
FIG. 8 is an embodiment of different memory sections corresponding to the data form of FIG. 7.

FIG. 6 illustrates an embodiment of aggregating debugging information or diagnostic data into a NFC token or tag. For instance, different types of progress code may be generated and logged at different times in the different phases or stages. Accordingly, these data points or BIOS checkpoints can be organized according to a page format such as seen in FIG. 7 and saved in a particular address in the memory (FIG. 8) of the NFC tag.

Although the embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A computer implemented method comprising:
    receiving a debug retrieval request to retrieve a debug status data during execution of a UEFI firmware of a computer system, wherein the debug retrieval request is received during one of subsequent phases after a SEC phase;
    initiating a debug aggregation function in response to the debug retrieval request;
    aggregating the debug status data into a data token, wherein the debug aggregation function starts collecting or gathering the debug status data that are generated after the debug retrieval request is received; and
    retrieving the debug status data during a security (SEC), pre-EFI initialization environment (PEI), driver execution environment (DXE), or boot device selection (BDS) stage of execution of the UEFI firmware, wherein a second debug status data is retrieved during the same or different stage that the stage the debug status data is retrieved, and the debug status data and the second debug status data are aggregated into the data token.

2. The method of claim 1, further comprising:
determining if the debug retrieval request has an instruction to aggregate the debug status data into a NFC compliant data form.

3. The diode device of claim 1, The method of claim 1, further comprising:
aggregating the debug status data into the data token as a NFC compliant data form.

4. The method of claim 1, wherein the step of initiating the debug aggregation function further comprising:
initiating a NFC application to consume a NFC protocol of the computer system.

5. The method of claim 4, further comprising:
initiating a NFC management function to generate the NFC protocol.

6. The method of claim 5, further comprising:
initiating a NFC host controller driver function for interfacing with a NFC reader device.

7. A Computer System comprising:
a memory; and
computer-readable instructions stored at the memory and executable by a microprocessor to:
receive a debug retrieval request to retrieve a debug status data during execution of a UEFI firmware, wherein the debug retrieval request is received during one of subsequent phases after a SEC phase;
initiate a debug aggregation function in response to the debug retrieval request;
aggregate the debug status data into a data token, wherein the debug aggregation function starts collecting or gathering the debug status data that are generated after the debug retrieval request is received;
wherein the instructions are further to:
retrieve the debug status data during a security (SEC), pre-EFI initialization environment (PEI), driver execution environment (DXE), or boot device selection (BDS) stage of execution of the UEFI firmware, wherein a second debug status data is retrieved during the same or different stage that the stage the debug status is retrieved; and
wherein the instructions are further to:
aggregate the debug status data and the second debug status data into the data token.

8. The computer system of claim 7, wherein the instructions are further to:
determine if the debug retrieval request has an instruction to aggregate the debug status data into a NFC compliant data form.

9. The computer system of claim 7, wherein the instructions are further to:
aggregate the debug status data into the data token as a NFC compliant data form.

10. The computer system of claim 7, wherein the instructions are further to:
initiate a NFC application to consume a NFC protocol.

11. The computer system of claim 10, wherein the instructions are further to:
initiate a NFC management function to generate the NFC protocol.

12. The computer system of claim 11, wherein the instructions are further to:
initiate a NFC host controller driver function for interfacing with a NFC reader device.

* * * * *